United States Patent
Kaupp et al.

(12)
(10) Patent No.: US 6,288,636 B1
(45) Date of Patent: Sep. 11, 2001

(54) ACTIVE OCCUPANT RESTRAINT SYSTEM HAVING AN IGNITION BUS LINE LAID IN A RING SHAPE AND/OR IN A STUB SHAPE

(75) Inventors: Michael Kaupp, Horb-Ahldorf; Michael Meyer, Altdorf; Manfred Mueller, Deizisau; Harald Rudolf, Tuebingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/634,004

(22) Filed: Aug. 7, 2000

(30) Foreign Application Priority Data

Aug. 6, 1999 (DE) .............................................. 199 37 151

(51) Int. Cl.$^7$ ...................................................... B60Q 1/00
(52) U.S. Cl. ...................... 340/438; 340/436; 307/10.1; 280/730.2; 280/735
(58) Field of Search ..................................... 340/436, 438; 280/730.2, 735, 739; 180/282, 274; 307/10.1, 121

(56) References Cited

U.S. PATENT DOCUMENTS

| | | | |
|---|---|---|---|
| 4,641,041 | * | 2/1987 | Mattes et al. .......................... 340/438 |
| 4,924,774 | * | 5/1990 | Lenzen ................................ 102/202.7 |
| 5,322,323 | * | 6/1994 | Ohno et al. .......................... 280/730.2 |
| 5,524,924 | * | 6/1996 | Steffens, Jr. ........................ 280/730.2 |
| 5,892,435 | * | 4/1999 | Buchheim et al. ................... 340/438 |
| 6,070,114 | * | 5/2000 | Fendt et al. .......................... 307/10.1 |

FOREIGN PATENT DOCUMENTS

| | | |
|---|---|---|
| 19619117 A1 | 11/1997 | (DE) . |
| 19813963 A1 | 5/1999 | (DE) . |

OTHER PUBLICATIONS

Bischof, M., "Networked Restraint Systems", *Automobil-Produktion*, Jun. 1997, pp. 16–1 –16–20.

* cited by examiner

*Primary Examiner*—Van T. Trieu
(74) *Attorney, Agent, or Firm*—Crowell & Moring LLP

(57) ABSTRACT

An active occupant restraint system for a motor vehicle has a central control unit and a plurality of active restraining devices with associated triggering units which are connected to the central control unit for the transmission of ignition information by an ignition bus line system having at least one ring line and/or at least one stub line. The triggering units within a respective ring and/or stub line of the ignition bus line system are arranged as a function of a predeterminable protection significance priority of the restraining devices assigned to the triggering units such that, with a decreasing protection significance priority, they are situated farther away from the central control unit. The occupant restraint system comprises one or more multistage restraining devices with pertaining triggering units, with the triggering unit pertaining to a higher stage of each multistage restraining device arranged in the corresponding ring or stub line closer to the central control unit than the triggering unit pertaining to a lower stage.

3 Claims, 2 Drawing Sheets

ACTIVE OCCUPANT RESTRAINT SYSTEM HAVING AN IGNITION BUS LINE LAID IN A RING SHAPE AND/OR IN A STUB SHAPE

BACKGROUND AND SUMMARY OF THE INVENTION

This application claims the priority of German patent document 199 37 151.2, filed Aug. 6, 1999, the disclosure of which is expressly incorporated by reference herein.

The invention relates to an active occupant restraint system for a motor vehicle, having a central control unit and a plurality of active restraining devices and associated triggering units that are connected by way of an ignition bus line system for transmitting ignition information to the central control unit, the ignition bus line system comprising at least one ring line and/or at least one stub line.

In an occupant restraint system of this generic type, such as disclosed, for example, in German Patent Document DE 196 19 117 A1, the end stages of a triggering electronic system for an active occupant restraint system in a motor vehicle are connected to a central control unit by lines which are configured in a stub shape and in a ring shape.

German Patent Document DE 198 13 963 A1 discloses another active occupant restraint system for a motor vehicle which comprises a central control unit with ignition bus lines configured in a ring shape and in a stub shape. Control modules for active occupant protection systems are embedded in the ignition bus lines. The active occupant protection systems include belt tightening devices for drivers, front passengers and rear occupants, as well as rear, side, window and knee air bags in the driver, front passenger and rear passenger area. They are combined into groups having the same method of operation, spatial correlationship and/or common triggering in the event of a certain accident type with a respective pertaining ring or stub line. Thus, the rear and knee air bags for drivers or front passengers are triggered by way of a first ignition bus line arranged in a ring shape. All belt tightening devices in the motor vehicle are situated in a second ring configured ignition bus line; side and window air bags for the driver and front passenger are ignited by means of stub-configured ignition bus lines. The control modules assigned to the active occupant restraint systems are arranged in the ignition bus lines corresponding to their triggering sequence in the event of a crash. Those active occupant restraint systems which, in the event of a crash, are triggered earlier than others are situated farther away from the central control unit in the line paths than are the control modules of active occupant restraint systems which ignite later when triggered.

The article by M. Bischoff, "Networked Restraint Systems", *Automobil-Produktion*, Jun. 1997, describes a bus line system with a central control unit, in which ignition end stages for a plurality of active occupant protection systems in a motor vehicle are connected with the central control unit via a tree structure. The ignition end stages are combined in groups corresponding to the function of the active occupant protection systems to which they are assigned. Thus, for example, the ignition end stages of the active occupant protection systems for side impact and for frontal impact are situated on different lines. As a result, even in the event of a side impact, which can result in a destruction of the bus line to the ignition end stages of the active occupant protection systems for a side impact, it is still possible to trigger the active occupant protection systems which protect against a frontal impact, because these are controlled in a different bus line branch.

It is an object of the invention to provide an active occupant restraint system of the initially mentioned type with a high reliability This and other objects and advantages are achieved by the active occupant restraint system according to the invention, in which the triggering units are arranged within respective ring lines and/or stub lines of the ignition bus line system as a function of a definable protection significance priority of the retraining devices assigned to the triggering units. In particular the triggering units are situated farther away from the central control unit with a decreasing protection significance priority.

One embodiment of the invention comprises one or more multi-stage restraining devices with pertaining triggering units, in which the triggering unit pertaining to a higher stage of each multi-stage restraining device is situated in the corresponding ring or stub line, closer to the central control unit than the triggering unit pertaining to a lower stage.

In this manner, a modular active occupant restraint system is created in which the same modules can be used, and which is particularly suitable when using only one or a few variants of triggering units for the flexible installation into different vehicle types. Further, such an occupant restraint system requires only a comparatively small number of line paths in the vehicle for controlling the triggering units. In particular, the ignition bus principle with only a few line channels permits the use of peripheral units which are connected to the bus line system by means of plugs which have only a few connection pins.

In a further embodiment of the invention, the triggering units of active restraining devices that are activated at different times are arranged as a function of the triggering sequence of the restraining devices assigned to the triggering units, such that the triggering unit of a restraining device with an earlier triggering time is farther away from the central control unit than that of a restraining device with a later triggering time. In this manner, even when some of the triggering units are already ignited (so that the ignition bus line in the area of these triggering units may be damaged), it can be ensured that ignition commands can always reach the triggering units which are arranged on the output side and are not ignited, via the bus system.

Other objects, advantages and novel features of the present invention will become apparent from the following detailed description of the invention when considered in conjunction with the accompanying drawings.

DETAILED DESCRIPTION OF THE DRAWINGS

Figure 1:
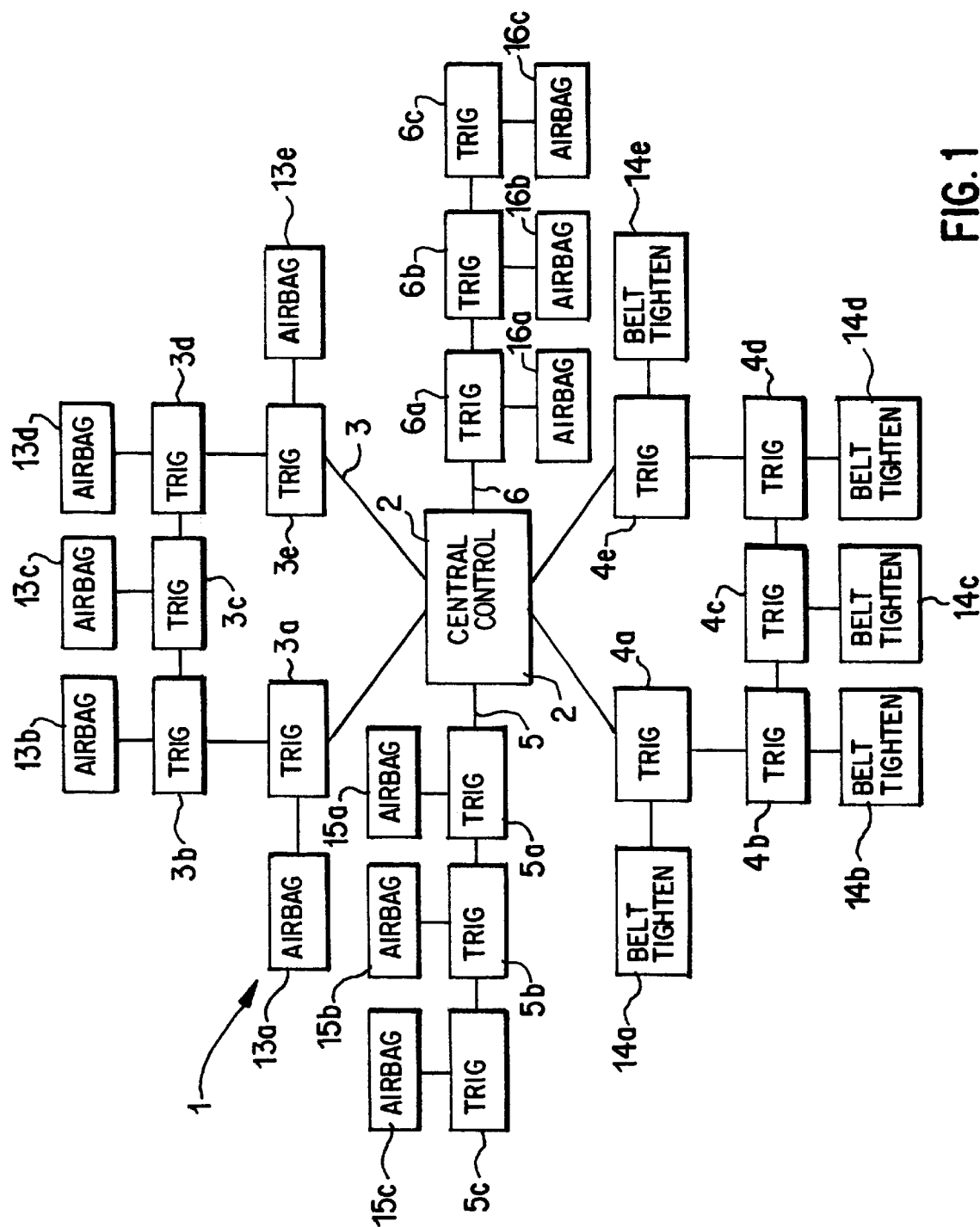
FIG. 1 is a view of an active occupant restraint system having a triggering control system and several triggering units for active occupant restraining elements which are connected to ring configured and stub configured ignition bus lines.

FIG. 1 illustrates an active occupant restraint system 1 with a central control unit 2. The occupant restraint system contains several triggering units 3a to 3e, 4a to 4e, 5a to 5c and 6a to 6c for conventional active occupant restraining devices 13a to 13e, 14a to 14e, 15a to 15c and 16a to 16c, in a motor vehicle. The triggering units 3a to 3e and 4a to 4e are each connected to ring configured ignition bus line loops 3 and 4. In contrast, the triggering units 5a to 5c and 6a to 6c are situated in stub configured ignition bus lines 5 and 6. The triggering units 3a and 3e in the ignition bus line loop 3 are each assigned to the second stage of a two-stage driver and front passenger air bag 13a, 13e. In the event of a triggering, this second stage of the driver and front passenger air bag is ignited after a first stage of driver and front passenger air bags 13b, 13d to which the triggering units 3b and 3d belong. The triggering unit 3c is used for igniting a driver knee air bag 13c.

The triggering units 4a to 4e actuate active belt tightening devices. Specifically, the triggering unit 4a actuates a belt tightening device 14a for the driver; triggering unit 4b actuates a belt tightening device 14b for the driver side area of a rear seat; triggering unit 4c actuates a belt tightening device 14c for the center area of a rear seat; triggering unit 4d actuates a belt tightening device 14d in the front passenger side area of the rear seat; and triggering unit 4e actuates a belt tightening device 14e for the front passenger.

The triggering units 5a to 5c in the stub configured ignition bus line 5 are used for the ignition of a left frontal side air bag 15a, a left window bag 15b and a left rear side bag 15c. Correspondingly, the triggering units 6a to 6c in the stub configured ignition bus line 6 are assigned to a right frontal side air bag 16a, to a right window bag 16b and to a right rear side air bag 16c.

In the ring configured and stub configured ignition bus lines 3, 4, 5 and 6, the triggering units for the active restraining elements are therefore combined corresponding to the function of the active restraining elements which they ignite. In the ring configured ignition bus line 3, those triggering units are provided which are used for igniting air bags which protect against frontal impact. By means of the triggering units in the ignition bus line 4, belt tightening devices are activated in the vehicle. The triggering units in the stub configured ignition bus lines 5 and 6 are used for controlling active occupant restraint systems which protect against side impacts.

An arrangement of triggering units for active restraining devices in an ignition bus line system, as illustrated in FIG. 1, permits not only simple installation of a comprehensive active occupant restraint system in a motor vehicle during the assembly of the vehicle, but also provides an occupant restraint system which can easily be retrofitted and expanded. Further triggering units for additional restraining devices need only be brought in contact with already existing ignition bus lines.

Furthermore, a system is created which has high functional reliability. Although, in principle, there is the danger that the ignition bus line itself will be damaged or destroyed at least locally because of thermal effects when the triggering units are ignited, serious consequences of such damage or destruction can be avoided by arranging the triggering units for multistage restraining devices (such as the two-stage driver and front passenger air bags) in the ignition bus line such that the triggering units for a higher stage are situated closer to the central control unit 2 than those for lower stages.

For example, ignition of the first stage of the two-stage driver and front passenger air bag by triggering units 3b or 3d, may lead to an interruption of the ignition bus line between the triggering units 3a and 3b or 3e and 3d. However, because the ignition bus line between the central control unit 2 and the triggering units 3a and 3e cannot be damaged in this case, reliable ignition of the second stage of the driver or front passenger air bag by means of the triggering units 3a and 3e is nevertheless ensured.

Figure 2:
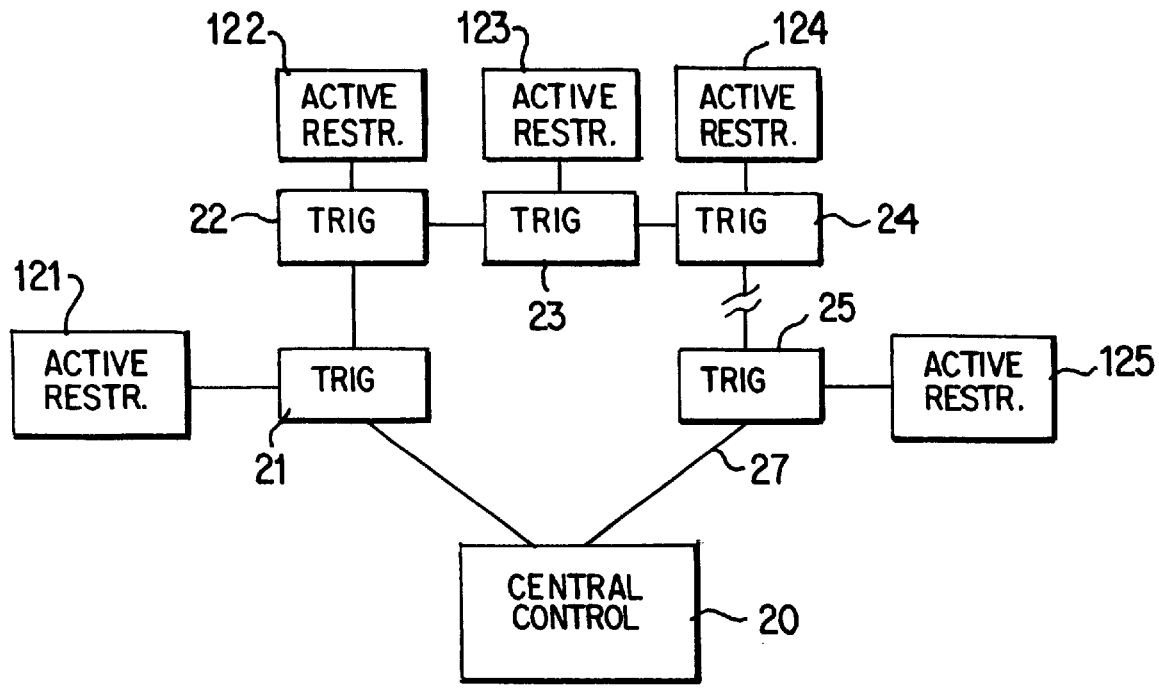
FIG. 2 is a view of triggering units for active occupant restraining elements in a ring configured ignition bus line which is interrupted.

In addition, a corresponding functional reliability is achieved when triggering units are arranged in the ignition bus line corresponding to their triggering sequence. In the case of the ring configured ignition bus lines 3 and 5, these are guided at two points onto the central control unit 2, so that a simple interruption of the ignition bus line ring does not lead to a function failure of the active occupant restraint system. As illustrated in FIG. 2, which shows a central control unit 20 with triggering units 21 to 25 for active restraining systems 121–125 in a ring configured ignition bus line 27, even when the ignition bus line between the triggering units 24 and 25 is interrupted because of external effect, all triggering units, starting from the central control unit 20, are still correctly controlled. The triggering unit 25 is ignited via the line branch of the ignition bus 27 between the central control unit 20 and the triggering unit 25. The triggering units 21 to 24 are controlled by the left line branch of the ignition bus line loop 27.

In the ring configured ignition bus line 4 from FIG. 1, the triggering units 4a to 4e are arranged corresponding to a protection significance priority of the active belt tightening devices 14a–14e. Because the forward belt tightening devices can prevent vehicle occupants from impacting the front area onto the dashboard or the steering wheel in an impact situation, the triggering units 4a and 4e for the belt tightening devices of the driver 14a and the front passenger 14e are connected by means of the ignition bus line 4 directly with the central control unit 2. In contrast, the belt tightening devices in the rear area of the vehicle do not have the same protection significance as the belt tightening devices in the front area of the vehicle; accordingly, the triggering units 4b and 4d for the belt tightening devices 14b and 14d in the rear area have no direct connection with the central control unit 2. By virtue of this arrangement of triggering units in the ring configured ignition bus line 4, the failure probability of the belt tightening devices for the driver and the front passenger in an accident situation due to an interruption of the ignition bus line is lower than that of the other belt tightening devices.

Figure 3:
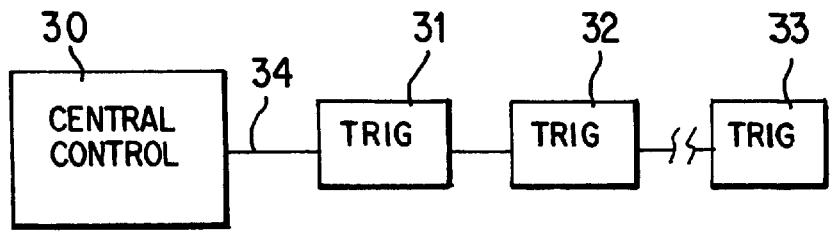
FIG. 3 is a view of triggering units for active occupant restraining elements in an interrupted stub configured ignition bus line.

In contrast to a ring configured ignition bus line, in a stub configured ignition bus line the return of the bus line cable loom to the central control unit 2 can be eliminated. As illustrated in FIG. 3, which shows a central control unit 30 with triggering units 31 to 33 connected to an ignition bus line 34 configured in a stub, this means, however, that, when an interruption occurs at any point of the ignition bus line, the triggering units which follow the interruption can no longer be controlled, resulting in a partial system failure. For this reason, in the stub configured ignition bus lines 5 and 6 of the active occupant restraint system of FIG. 1, the triggering units are again arranged corresponding to the priority of the restraining devices to which they are assigned. Since the stability of the vehicle body in the rear area, as a result of the near-by wheel cases, is stiffer than in the frontal area and the occupation rate in the rear area is lower than in the frontal area, the protecting effect of a frontal side bag has a higher value than that of a window bag or a rear side bag. Therefore, the triggering units 5a and 6a for the left and right frontal side bags 15a, 16a are connected directly to the central control unit by means of the ignition bus lines 5 and 6. These are adjoined by the triggering units 5b, 5c, 6b, 6c for the left and right window bags 15b, 16b and the left and right rear side bags 15c, 16c with the lower protection significance priority.

Finally, it is possible to arrange the triggering units corresponding to a defined or expected triggering sequence in an ignition bus line configured in a stub. Thus, it can be achieved that, during triggering operations, no ignition bus line sections are destroyed or damaged which are required for igniting triggering units with a later triggering time.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An active occupant restraint system for a motor vehicle, comprising:

a central control unit; and a plurality of active restraining devices with associated triggering units which are connected by way of an ignition bus line system for transmission of ignition information between the triggering units and the central control unit; wherein the ignition bus line system includes at least one of a ring configured bus line and a stub configured bus line; and a plurality of said triggering units are arranged within a particular bus line of the ignition bus line system with their respective proximity to the central control unit via the particular bus line being a function of a predeterminable protection significance priority of their associated restraining devices, such that, with a decreasing protection significance priority, they are situated farther away from the central control unit via the particular bus line.

2. An active occupant restraint system according to claim 1, wherein:

the occupant restraint system has at least one multistage restraining device, each stage of which has a pertaining triggering unit; and a triggering unit pertaining to a higher stage of each multi-stage restraining device in a corresponding ring or stub line is arranged closer to the central control unit via a particular bus line of the ignition bus line system, than a triggering unit pertaining to a lower stage.

3. An active occupant restraint system according to claim 1, wherein:

the triggering units of active restraining devices whose activation is provided to occur at different times, are arranged as a function of a triggering sequence of the restraining devices assigned to the triggering units, such that a triggering unit of a restraining device with an earlier triggering time is farther removed from the central control unit via a particular bus line of the ignition bus line system, than that of a triggering unit with a later triggering time.

* * * * *